United States Patent [19]

Drost

[11] Patent Number: 4,681,255

[45] Date of Patent: Jul. 21, 1987

[54] CABLE DRIVEN SPA THERMOSTAT CONTROLLER

[76] Inventor: Kerry P. Drost, 11 Sacramento, Irvine, Calif. 92714

[21] Appl. No.: 820,633

[22] Filed: Jan. 21, 1986

[51] Int. Cl.$^4$ ............................................. G05D 23/00
[52] U.S. Cl. .......................................... 236/51; 4/524; 74/501 R; 236/94; 362/32
[58] Field of Search .................. 74/501 A; 236/51, 94; 362/32; 128/367; 4/524

[56] References Cited

U.S. PATENT DOCUMENTS

| | | | |
|---|---|---|---|
| 2,178,066 | 10/1939 | Clark | 236/51 U X |
| 2,207,865 | 7/1940 | Knight | 236/51 |
| 2,787,169 | 4/1957 | Farr et al. | 74/501 X |
| 2,855,153 | 10/1958 | Tyler | 236/51 X |
| 3,307,421 | 3/1967 | Gilmore | 74/501 A |
| 4,384,190 | 5/1983 | Janson | 236/51 X |
| 4,566,374 | 1/1986 | Medema et al. | 362/32 X |

Primary Examiner—William E. Wayner
Attorney, Agent, or Firm—G. Donald Weber, Jr.

[57] ABSTRACT

A cable driven controller apparatus for controlling the thermostat setting at the spa side from inside the spa for the remotely located heating apparatus of a spa or similar device.

5 Claims, 5 Drawing Figures

CABLE DRIVEN SPA THERMOSTAT CONTROLLER

BACKGROUND

1. Field of the Invention

This invention is directed to the temperature controlling apparatus for a spa, in general, and, more particularly, to a an apparatus for selectively controlling the thermostat setting on the heating apparatus by means of a controller mechanism at the spa side and from inside the spa.

2. Prior Art

There are many known recreational devices of the spa or hot tub variety which are available on the market. These devices include heating apparatus which is used to heat the water contained within the spa or hot tub. The heating apparatus is selectively rendered operative by means of a thermostat which is controlled by the user of the spa or hot tub.

In most cases, the thermostat is mounted adjacent to the heating apparatus. This is, typically, because the thermocouple which is connected to the thermostat and which senses the temperature at the water heating apparatus is, desirably, mounted in close proximity to the thermostat. This prevents an excessive temperature gradient across the thermocouple and/or its connectors. However, in the prior art, because the thermostat is located adjacent to the heating unit and because the heating unit is usually mounted at a location which is remote from the spa (for example underneath the spa structure) any alteration or modification in the water temperperture which is to be effected by changing the setting of the thermostat, is either awkward or cumbersome because of the remote location thereof. As a consequence, users of the spa tend to partake of the use of the spa with a temperature which is not precisely that which is desired.

The techniques which have been used in the past are both cumbersome and awkward. Moreover, these techniques are less than accurate. Typically, the prior art techniques require removal of panels or doors to gain access to thermostat location for adjustment. This requirement can be a substantial inconvenience to the spa user.

Some control manufacturers have provided remotely located thermostats. However, these all require that electricity, either 110 volts or 6 volts be located at the spa side. This technique is clearly unsafe. As well, the results (i.e. thermostat adjustment) are unreliable. Also, moisture and humidity soon render the controls or the light circuits inoperative.

SUMMARY OF THE INSTANT INVENTION

In this invention, a control panel is placed immediately adjacent the useful area of the spa. The control panel includes mounting for pneumatic switches which are used to control other aspects of the spa equipment such as the jet air, the lights and so forth. A first pulley or sheave is mounted at the interior of the control panel with a control knob on the outside. A further control pulley or sheave is mounted at the thermostat which is mounted in the remote location adjacent to the heating apparatus. A suitable cable arrangement is connected between the two sheaves. Thus, by manipulating the control knob at the control panel, the first sheave is caused to move and, thereby, move the second sheave as a result of the interconnection effected by the cable.

In one embodiment, a fiber optic cable can be connected between the control panel and a suitable light source at the temperature controlling apparatus, including the heater, of the spa equipment. This fiber optic cable provides a visual indication of the operative status of the system.

DESCRIPTION OF A PREFERRED EMBODIMENT

Figure 1:
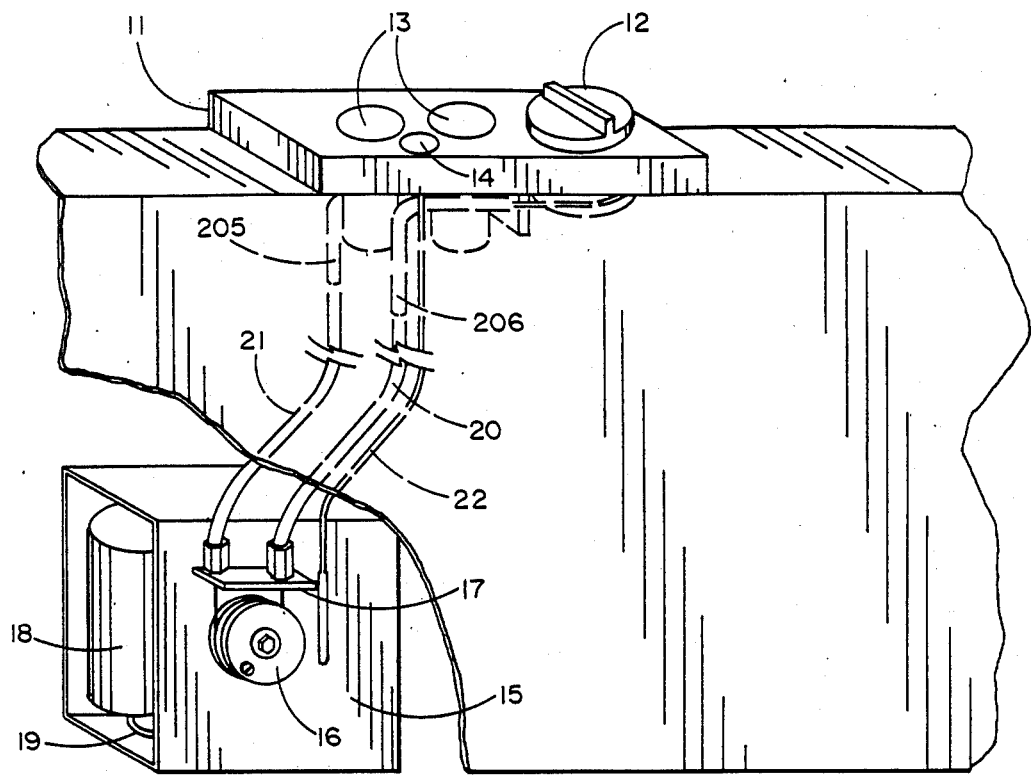
FIG. 1 is a schematic representation of the invention in a typical application thereof.

Referring now to FIG. 1, there is shown a general view of the instant invention as arranged in a preferred application thereof. In particular, the arrangement is shown with respect to a spa, hot tub or other similar kind of device. In this instance, the control panel 11 is mounted on the upper ledge or surface of the spa device. The control panel 11, in this instance, includes a number of control related elements. For example, the control knobs, buttons or the like indicated by reference numeral 13 are, in one embodiment, pneumatic control units. These units (switches) are used to control the air flow, the light switch or other aspects of the spa and its operation. These units do not form a portion of this invention, per se.

In addition, as shown in FIG. 1, the panel 11 includes an indicator light 14 and a control knob 12. As will be described hereinafter, the indicator device 14 is, in fact, a fiber optic tube a cable which is used to indicate that certain portions of the spa operating apparatus and gear are in an operative condition.

In addition, the knob 12 is a rotatable knob which is used to control the temperature of the water in the spa. In particular, the knob 12 is used to adjust the thermostat (as will be described hereinafter) so that the temperature of the water in the spa is controlled by the operation of the heater element. For convenience, suitable indicia are provided on panel 11 adjacent knob 12 to permit selection of positions of the knob.

Also, shown mounted under the sides 10 of the spa, is the general control apparatus and gear for the spa. In particular, the gear is shown mounted in a suitable mounting device 15 which can be included in an appropriate housing such as a metal box or the like. Mounted adjacent to or inside of the housing is the heater 18 which can be of any suitable type of heater which heats the water retained within the heater reservoir. Typically, this heater is powered by electricity and is an "instantaneous" heater. The heater is conventional and forms no part of this invention, per se.

A thermocouple 19 is disposed adjacent to the heater 18 in the conventional manner to detect the temperature of the water in the heater. The thermocouple 19 is connected to a thermostat (not shown in FIG. 1) and supplies a signal thereto. In a conventional fashion, the thermostat provides a signal to a suitable valve or switch to permit flow of fuel to heater 18 in conjunction with the temperature signals supplied by thermocouple 19 and the thermostat which is controlled by knob 12.

Mounted on support wall 15 is a sheave or pulley 16 which is connected to the shaft of the thermostat as will be described hereinafter. Also mounted on wall 15 is a suitable mounting bracket 17. Disposed in the mounting bracket 17 are suitable feedthrough and/or termination hardware which is connected to the outer sleeve or cable covering for cables 20 and 21. The inner portions of cables 20 and 21 are connected to pulley 16. The other ends of these internal cables are connected to a pulley (described hereinafter) which is connected to knob 12.

The fiber optic tube 22 is shown connected between the control panel 11 and a suitable location on the operating apparatus in container 15. The suitable location may be any appropriate position in the control apparatus including adjacent to a pilot light associated with the "power on" controls or the like. Through the fiber optic cable 22, a "power on" light indication is produced at panel 11, even though the actual power indicator is located with and at the apparatus 15.

In essence, when the system is rendered operative, a light signal is generated at the control apparatus. This light signal is transmitted to indicator 14 via the fiber optic cable 22. The operator then adjusts knob 12 to an appropriate setting to select a desired temperature condition for the water within the spa system. Through the operation of cables 20 and 21, a positive push-pull interaction is maintained with pulley 16. Pulley 16 is affixed to the thermostat and, thereby, adjusts the operation of the heater apparatus. By properly calibrating the positioning of knob 12, a very accurate control of the spa operation can be achieved.

Figure 2:
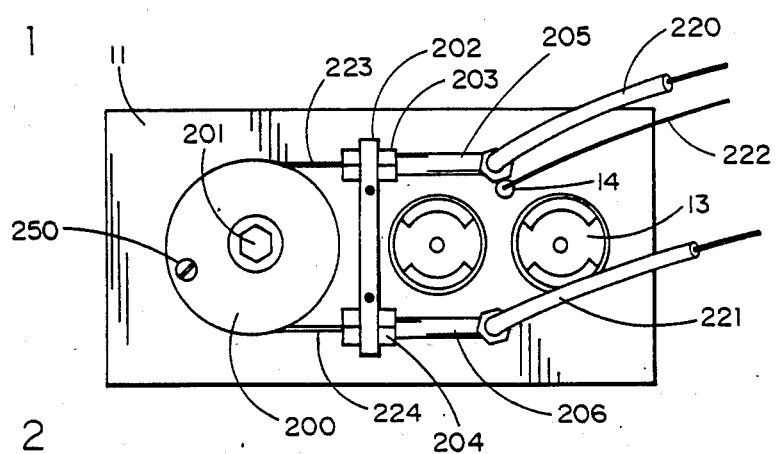
FIG. 2 is a plan view of the cable drive mechanism of the instant invention at the control panel end.

Referring now to FIG. 2, there is shown the reverse side of control panel 11. In FIG. 2, a suitable mounting block 202 is mounted to the panel for purposes described hereinafter. The method and means for mounting the block 202 to the panel 11 are conventional.

The inner end portions of units 13 are represented schematically. The inner end of indicator light 14 is shown connected to the fiber optic cable 22 which is a conventional fiber optic tube element.

A pulley 200 is shown mounted at panel 11. In particular, pulley 200 is connected to knob 12 via a suitable aperture in and through panel 11. In the embodiment shown, pulley 200 is mounted to knob 12 by means of a suitable connecting device such as a shaft which can be in the form of a bolt or screw 201.

Mounted in block 202 are suitable through mounting devices 203 and 204. These devices include conventional hardware for passing cables through apertures in the mounting block 202. In addition, these mounting elements are arranged to grip and maintain the ends of the outer sleeves or tubes 220 and 221, respectively. These outer sleeves or tubes are, typically, of reinforced rubber or some other relatively flexible, chemically inert and electrically non-conductive material. These tubes act the carries and supports for the internal driving cables 223 and 224, respectively.

The driving cables 223 and 224 are mounted in grooves in the sheave 200 and secured thereto by suitable means. As shown in FIG. 2, the cable 224 is secured to sheave 200 by means of an adjustable screw 250. A similar screw or connector is provided for cable 223, as is shown in FIG. 3.

In some instances, it is desirable to have fixed or rigid conduits 205 and 206 for conducting the respective cables to the mounting elements in the mounting block 202. The conduits 205 and 206 are arranged, in this embodiment, in an L-shape to specifically position the cables 222 and 221 relative to panel 11. The conduits are especially useful when the units 13 comprise elongated components which extend from panel 11. By using the conduits 205 and 206, the cables 221 and 222 are prevented from entangling with the units. When the conduits are used, the sleeves 220 and 221 are mounted thereto instead of to the hardware at block 202.

Figure 3:
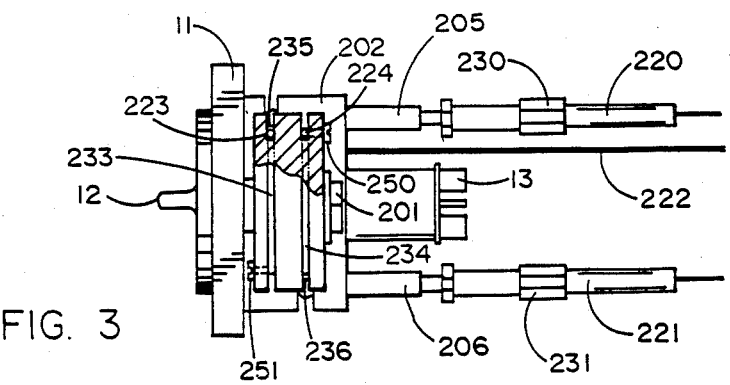
FIG. 3 is a side view of the apparatus of the instant invention as shown in FIG. 2.

Referring now to FIG. 3, there is shown an end view of the components shown in FIG. 2. In particular, the end view of panel 11 is depicted. The arrangements of knob 12 and pulley 200 with respect to panel 11 are shown. In addition, the bolt 201 is shown to provide the connection between pulley 200 and knob 12. In this case, knob 12 and pulley 200 are arranged to rotate together, along with the fixed axis represented by the bolt 201.

The grooves 233 and 234 are shown in the pulley 200. Each of these grooves receives a cable 223 or 224, respectively. Each of these cables is passed through an aperture 235 or 236 (together with the appropriate mounting apparatus 203 and 204). The screws 250 and 251 are used to retain the cable ends within the respective grooves.

In FIG. 3, the offset conduits 205 and 206 are shown connected to the cable sleeves 220 and 221 by the connecting hardware 230 and 231, respectively.

Thus, as knob 12 is turned, pulley 200 is rotated around the same axis, i.e. bolt 201. As pulley 200 is rotated, the cables 223 and 224 are moved in a push-pull arrangement within the respective grooves 233 and 234. These cables then pass through the conduits 205 and 206 as well as the outer sleeves 220 and 221 to interact with the pulley 16 as shown and described infra.

Figure 4:
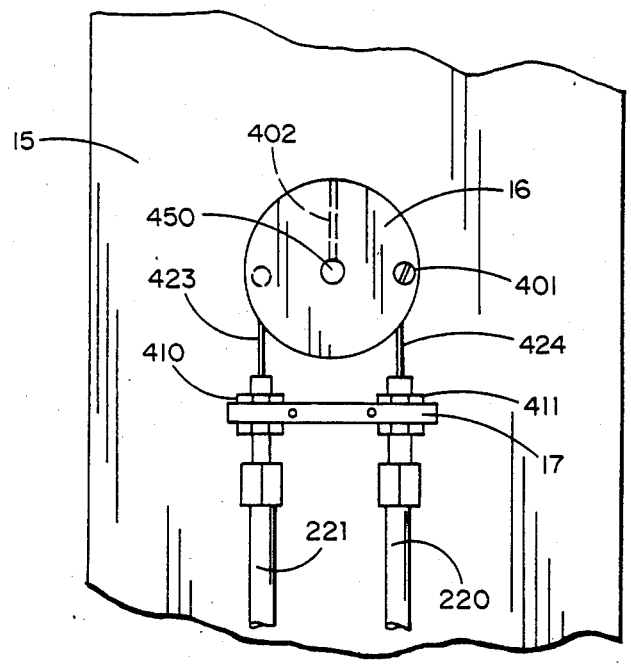
FIG. 4 is a plan view of the drive apparatus of the instant invention at the controlled end.

Referring now to FIG. 4, there is shown a plan view of the thermostat (or controlled) end of the drive apparatus shown in FIG. 1. In particular, the pulley 16 is mounted on shaft 450 which is, typically, the shaft of the thermostat (described infra). The pulley is affixed to shaft 450 by any suitable means such as a friction fit or the like. In one embodiment, a set screw is provided in the threaded slot 402.

The mounting block 17 is mounted on support 15 in any suitable fashion. The through-hole mountings apparatus 410 and 411 are provided. These through-hole mountings permit the inner cables 423 and 424 (the other ends of cables 223 and 224, respectively) to pass through the mounting plate onto pulley 16 in a controlled manner. In addition, the mounting elements 410 and 411 are used to engage the outer sleeves 221 and 220 as shown in FIG. 2.

Figure 5:
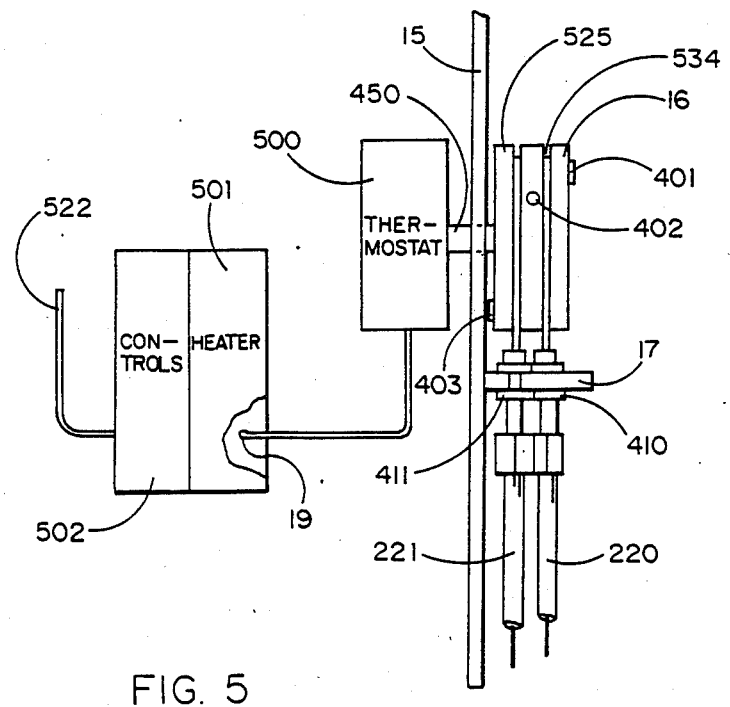
FIG. 5 is a side view of the apparatus of the instant invention as shown in FIG. 4.

Referring now to FIG. 5, there is shown a side view of the apparatus shown in FIG. 4. In FIG. 5, the thermostat 500 is mounted on one side of the support bracket 15 and the shaft 450 thereof passes through bracket 15 and is joined to pulley 16. The thermocouple 19 is connected to the thermostat 500. Thermocouple 19 is also disposed adjacent to heater 501 in a conventional fashion so as to sense the temperature at the heater. The thermocouple can be mounted at any suitable location and can measure the temperature of the heater, of the water or any parameter desired.

The spa controls 502 are shown schematically arranged adjacent to heater 501. This arrangement can be fashioned in any conventional manner. In addition, the fiber optic cable 522 is shown extending from the controls 502 toward the indicator light 14 shown in FIGS. 1 and 2. Thus, any suitable "power-on" indicator light arrangement can be used to transmit a light indication via the fiber optic cable 522 to the control panel 11.

The cables 423 and 424 are selectiveley rotated in a push-pull manner around pulley 16 in the grooves 534 and 535, respectively. The cables are, as noted above, maintained within the respective grooves by the appropriate screws or other means 401 and 403.

In describing the operation of the invention, the rotation of knob 12 causes pulley 200 to be rotated therewith. Rotation of pulley 200 moves cables 223 and 224 in a push-pull manner, as noted. The push-pull operation of cables 223 and 224 will, of course, cause push-pull operation of the other ends thereof represented by cables 423 and 424 at pulley 16. Rotation of pulley 16 will, through shaft 450, cause rotation of the thermostat 500. Rotation of thermostat 500 will alter the temperature setting which is responsive to the temperature signal detected by thermocouple 19. Thus, the operation of the heater 501 is effected.

By controlling the operation of heater 501, the temperature of the water maintained in the spa reservoir is also maintained and controlled. As a consequence, the temperature of the spa can be controlled at a control panel immediately adjacent to the spa while all of the other operating gear is remote therefrom. In addition, through the use of the push-pull, cable-driven device of the instant opertion, of the thermostat status can be obtained. Also, it is not necessary to have electricity supplied at the side of the spa.

It will be recognized by those skilled in the art that modifications can be made to the device as described. However, any such modifications or changes which fall with the purview of this description are intended to be included therein as well. This description is intended to be illustrative of the invention and is not intended to be limitative thereof. Rather, the scope of the invention is limited only by the claims appended hereto.

I claim:

1. A temperature controlling apparatus for use in conjunction with spas, comprising
    thermostat means mounted adjacent a water heating apparatus,
    temperature selecting means mounted remote from said thermostat means and adjacent to a side of a spa, and
    cable drive means connected between said thermostat means and said temperture selecting means such that said thermostat means is selectively driven by said temperature selecting means via said cable drive means,
    said cable drive means includes at least first and second sheaves and elongated cable means extending between said first and second sheaves to provide mutual rotational motion of said sheaves,
    each of said first and second sheaves includes a pair of grooves therein for receiving said elongated cable means,
    said elongated cable means includes a pair of separate driving cables,
    each of said separate driving cables is associated with a different one of said pair of grooves in said first and second sheaves,
    said first sheave is coupled to said thermostat means,
    said second sheave is coupled to said temperature selecting means, and
    fiber optic cable means extending from said water heating means to said temperature selecting means.

2. The apparatus recited in claim 1 wherein, said elongated cable means is formed of electrically insulating material.

3. The apparatus recited in claim 1 including,
    panel means mounted adjacent to the side of the spa for supporting said temperature selecting means and at least a portion of said cable drive means.

4. The apparatus recited in claim 1 wherein,
    said pair of separate driving cables is mounted to said first and second sheaves in the opposite coiling direction.

5. The apparatus recited in claim 1 wherein,
    said elongated cable means includes a sleeve through which an inner driving cable passes.

* * * * *